United States Patent
Mullins et al.

(10) Patent No.: US 10,068,104 B2
(45) Date of Patent: *Sep. 4, 2018

(54) CONDITIONAL REDACTION OF PORTIONS OF ELECTRONIC DOCUMENTS

(71) Applicant: Microsoft Technology Licensing, LLC

(72) Inventors: Christopher Lee Mullins, Sammamish, WA (US); Jonathan Edgar Fay, Woodinville, WA (US); Robert Earl Standefer, III, Duvall, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 84 days.

This patent is subject to a terminal disclaimer.

(21) Appl. No.: 15/010,956

(22) Filed: Jan. 29, 2016

(65) Prior Publication Data

US 2017/0220813 A1    Aug. 3, 2017

(51) Int. Cl.
| | |
|---|---|
| G06F 7/04 | (2006.01) |
| G06F 17/30 | (2006.01) |
| H04N 7/16 | (2011.01) |
| G06F 21/62 | (2013.01) |
| G06F 21/10 | (2013.01) |

(Continued)

(52) U.S. Cl.
CPC .... G06F 21/6218 (2013.01); G06F 17/30011 (2013.01); G06F 21/10 (2013.01); *G06F 3/0484* (2013.01); *G06F 17/30165* (2013.01); *G06F 21/62* (2013.01); *G06F 21/6209* (2013.01); *G06F 21/6227* (2013.01); *G06F 21/6245* (2013.01); *H04L 63/10* (2013.01)

(58) Field of Classification Search
CPC ...... G06F 21/10; G06F 21/62; G06F 21/6209; G06F 21/6218; G06F 21/6227; G06F 21/6245; G06F 17/30165; G06F 17/30011; G06F 3/0484; G06F 7/04; G06F 17/30; H04L 63/10; H04N 7/16

See application file for complete search history.

(56) References Cited

U.S. PATENT DOCUMENTS

| | | | |
|---|---|---|---|
| 7,386,439 B1 * | 6/2008 | Charnock | G06F 17/30699 704/9 |
| 7,536,635 B2 | 5/2009 | Racovolis et al. | |
| 8,584,005 B1 | 11/2013 | Pittenger et al. | |

(Continued)

OTHER PUBLICATIONS

"OpenText Announces Role-Based Redaction for Brava! for IBM Content Navigator," Published on: Jan. 29, 2015, Available at: http://www.opentext.com/who-we-are/press-releases?id=91E1159F7B314F72AFDA8A0EE24421C2.

*Primary Examiner* — Jayesh M Jhaveri

(74) *Attorney, Agent, or Firm* — Michael Best & Friedrich LLP

(57) ABSTRACT

A facility for performing contingent redaction of one or more portions of a document is described. The facility receives a request to materialize an identified document that identifies an entity for which the identified document is to be materialized. For a portion of the document identified by the request, the facility retrieves a criterion that must be satisfied to include the portion in a materialization of the document identified by the request. The facility evaluates the criterion for the entity identified by the request with respect to a present time. The facility causes the document identified by the request to be materialized for the entity identified by the request in a manner consistent with the result of the evaluation.

17 Claims, 12 Drawing Sheets

(51) Int. Cl.
  *G06F 3/0484* (2013.01)
  *H04L 29/06* (2006.01)

(56) References Cited

U.S. PATENT DOCUMENTS

| | | | |
|---|---|---|---|
| 9,043,247 B1 * | 5/2015 | Hart | G06F 17/30705 |
| | | | 706/12 |
| 9,069,982 B2 | 6/2015 | Coles et al. | |
| 9,195,853 B2 | 11/2015 | Fox et al. | |
| 9,734,148 B2 * | 8/2017 | Bendersky | G06F 17/30011 |
| 2006/0075228 A1 * | 4/2006 | Black | H04L 63/0428 |
| | | | 713/167 |
| 2009/0025063 A1 | 1/2009 | Thomas | |
| 2009/0323087 A1 | 12/2009 | Luo | |
| 2011/0119361 A1 * | 5/2011 | Issa | G06F 17/30011 |
| | | | 709/223 |
| 2011/0119576 A1 * | 5/2011 | Aumann | G06F 17/2282 |
| | | | 715/255 |
| 2015/0071542 A1 | 3/2015 | Dahl et al. | |
| 2015/0113390 A1 | 4/2015 | Vagell et al. | |

* cited by examiner

| document id | portion | redaction criteria |
|---|---|---|
| 01236744 | ¶ 3 | member (media_group) AND before (2/1/2016) |
| ⋮ | | | redaction criteria table — 600
— 601
— 611   — 612   — 613

*FIG. 6*

CONDITIONAL REDACTION OF PORTIONS OF ELECTRONIC DOCUMENTS

BACKGROUND

Redaction refers to the removal of content from a document, such as by deleting or obscuring the content. Conventionally, redaction occurs when a person is to review a completed document, but is not entitled to review one or more portions of the document. The typical approach to performing such redaction is to make a copy of the document and, in the copy, remove the content that the reviewer is not entitled to review, such as by deleting it, overwriting it, etc.

For example, during the discovery phase of a lawsuit, the plaintiff may request from the defendant a copy of a particular sent email message. The defendant determines that the plaintiff is not entitled to receive a certain paragraph of the email message, based upon the attorney-client privilege doctrine. Accordingly, the defendant makes a paper or electronic image of the email message, deletes or overwrites the paragraph in question, and provides this modified image to the plaintiff in response to the request.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for performing contingent redaction of one or more portions of a document is described. The facility receives a request to materialize an identified document that identifies an entity for which the identified document is to be materialized. For a portion of the document identified by the request, the facility retrieves a criterion that must be satisfied to exclude the portion from a materialization of the document identified by the request. The facility evaluates the criterion for the entity identified by the request with respect to a present time. The facility causes the document identified by the request to be materialized for the entity identified by the request in a manner consistent with the result of the evaluation.

BRIEF DESCRIPTION OF THE DRAWINGS

FIG. 6 is a table diagram showing sample contents of a redaction criteria table used by the facility in some embodiments to store redaction criteria that have been established for document portions.

DETAILED DESCRIPTION

Figure 1:
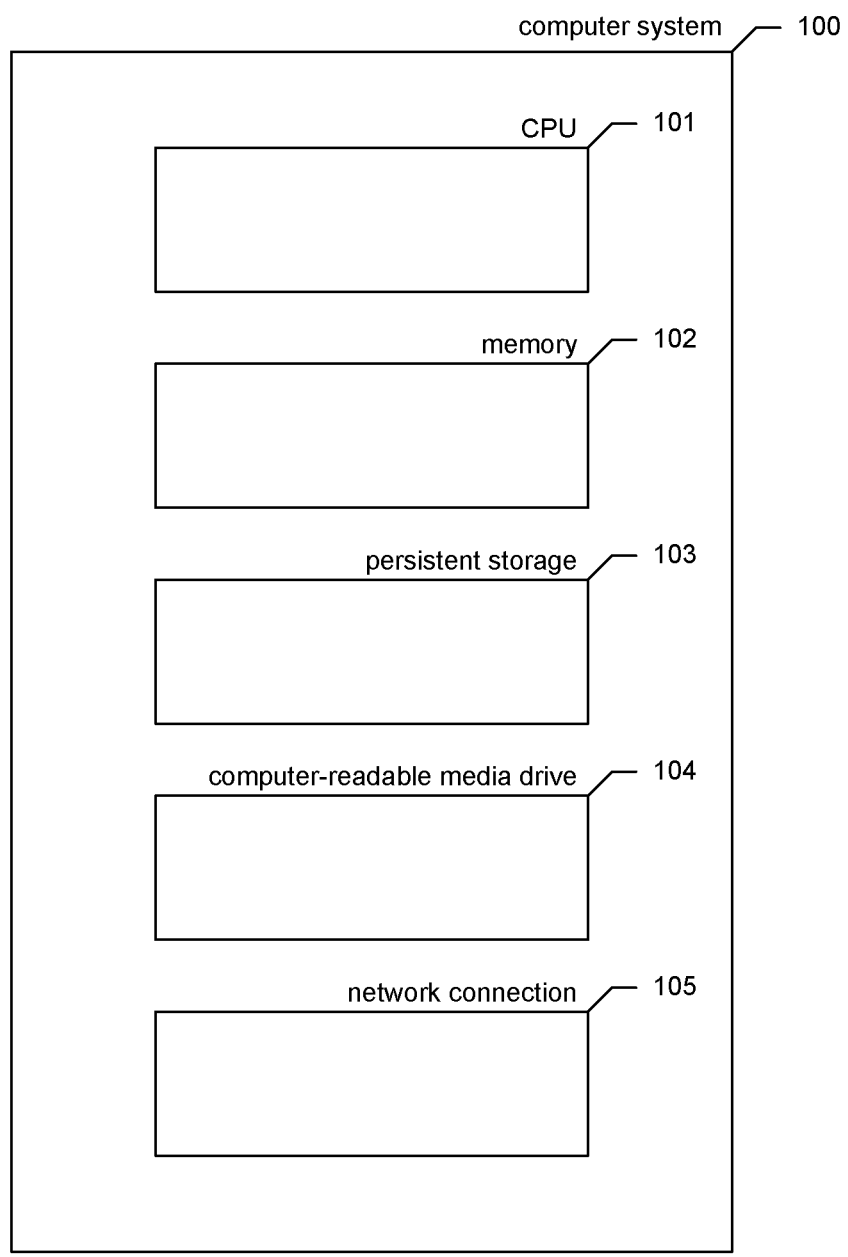
FIG. 1 is a block diagram showing some of the components typically incorporated in at least some of the computer systems and other devices on which the facility operates.

The inventors have recognized significant disadvantages of conventional redaction techniques. First, a different copy of a redacted document must be produced and maintained for each reviewer, for each level of redaction, for each combination of redacted portions, etc. Second, the portions of the document redacted in each copy are invariant. They cannot contract, such as to restore one formerly-redacted portion at the expiration of an embargo period, nor can they expand, to redact an additional portion that was belatedly found to be subject to a legal privilege, or that is no longer available to a reviewer in light of a change to her credentials. Third, once a copy of the document is created for redaction, the connection between the entire document and the copy that is redacted is broken; subsequent changes to the entire document cannot be reflected in the redacted copy without repeating the laborious redaction process for each such change. Fourth, content removal for redacted document portions is often not wholly effective, permitting some parts of some redacted portions to be accessed by reviewers. Fifth, the process is inefficient, expensive, and unpleasant to those engaged in it.

In order to overcome these disadvantages of conventional redaction techniques, the inventors have conceived and reduced to practice a software and/or hardware facility for conditionally redacting documents ("the facility"). Each time a document is requested by a user, the facility determines whether any portions of the document should be removed before making the document available to a user. In some embodiments, the process of making the document available to a user is referred to as "materializing" the document for the user, or generating a document "materialization" or "manifestation" for the user. In some embodiments, the facility limits the ability of a user for whom the document is materialized to make a separate copy of the document, making it more likely that each user can access the document only through the facility's materialization mechanism that applies its redaction functionality; in various embodiments, this involves disabling copying content to a clipboard, dragging content out of the document, capturing a screenshot, printing, etc.

In some embodiments, in order to identify portions for removal, the facility automatically evaluates one or more redaction criteria specified for one or more portions of the document by someone authorized to do so, such as an author of the document, an owner of the document, or a person having authority delegated by the author or owner. In various embodiments, the redaction criteria are based on a variety of kinds of information. In some embodiments, the redaction criteria are based directly on the requesting user's identity, such as a criterion that requires the requesting user to be on a deny list of users for redaction to occur, or be on an allow list of users for redaction to not occur. In some embodiments, the redaction criteria are based indirectly on the requesting user's identity, such as criteria that require the requesting user to have a particular role, be part of a particular organization, be included in a particular group, be at a particular point in an organizational hierarchy, have a particular clearance level or privilege level, etc. in order for redaction to occur or not occur. In some cases, a criterion that is indirectly based on the requesting user's identity can produce different results at different times, as the requesting user shifts into or out of roles, groups, etc. In some embodiments, the redaction criteria are explicitly based on the time of the request, such as a criterion that implements an embargo making the document portion unavailable until after the specified release time, or a criterion that implements expiration of the document portion by making it unavailable after a specified expiration time.

In various embodiments, the facility performs conditional redaction on behalf of entities other than individual people. As one example, in some embodiments, the facility performs conditional redaction on behalf of groups of people, such as a group of people to whom the document is going to be presented in a meeting. In some such embodiments, the facility redacts any portion whose redaction criteria evaluate to true for any member of the group. In some embodiments, the facility performs conditional redaction on behalf of computer systems, such as computer systems performing searching or machine-learning modeling using the document on behalf of a particular user, sometimes called the "principal." In some such embodiments, the facility uses an evaluation of redaction criteria with respect to the principal to determine whether to redact portions of the document returned to the requesting computer system.

In some embodiments, the facility provides a user interface that enables an authorized person—such as a document's owner or author—to view the document as it would be redacted for a particular other user, such as to evaluate whether the redaction criteria that the owner or author has specified behave as expected, or simply to discover how much of the document the other user (the "subject user") can see. In some cases, this "spoofing" is performed contemporaneously—that is, the redaction criteria are evaluated in the present time frame. In some embodiments, the user interface provides a mechanism for the owner or author to specify a time other than the present time for which the redaction criteria are to be evaluated in generating the spoofed document manifestation. In various embodiments, the facility provides a variety of additional similar information, including whether a portion of the document will ever be accessible; what events could occur that would change the accessibility of a portion of the document; and, if redaction criteria were to be changed in a particular way, how it would affect who could access a portion of the document.

In some embodiments, the facility permits a document's owner, author, or other authorized person to designate portions of the document that are subject to redaction criteria using painting interactions—similar to painting interactions sometimes used to paint formats in word processing documents. In various embodiments, such interactions can take the form of various combinations of dragging the mouse cursor over these portions, clicking on these portions; using the user's finger to tap, slide over, scribble over, or circle these portions; using a stylus to tap, slide over, scribble over, or circle these portions; etc. In various embodiments, the facility manages the redaction of portions of documents of a variety of types, including portions of documents containing text, images, video, audio, diagrams, spreadsheets, slideshows, messaging and/or commenting content, etc.

In some embodiments, the facility permits a user to paint redaction criteria onto a representation of the document containing the document's full contents and mirroring the document's formatting. In various other embodiments, the facility permits the user to paint redaction criteria onto a document representation that relates to the document in a variety of other ways, including: a copy of the document containing the document's full contents but being formatted differently from the document, such as to accommodate visual indications of redaction criteria established for portions of the document by the facility; an outline of the document; a summary of the document; a skeleton of the document; etc.

In various embodiments, the facility displays various kinds of visual indications of redaction criteria established for different portions of the document, such as by representing different redaction criteria with different colors, patterns, shapes, etc. In various embodiments, the facility adds such visual indications of redaction criteria in various positions, including, for example, in the document representation's margin; in a scrollbar for scrolling the document representation; in a pop-up window triggered by user interactions such as hovering a mouse cursor or directing a human gaze; within the content of the document representation; etc. In various embodiments, these indications take various forms, including, for example, painting segments of the height of the scrollbar with different colors or patterns relating to redaction criteria established for document portions at corresponding positions within the representation; directly painting the content of the document representation with different colors or patterns, either changing the color of the content (e.g., text) itself, or changing the color or pattern of the background against which the content is displayed, or inserting a border of a particular color and/or pattern around the content; adding to the margin shapes whose presence, colors, patterns, dimensions, or areas relate to the content beside them; etc.

In various embodiments, the facility establishes redaction criteria for document portions at various different levels of granularity, such that, in painting, the user can select, for example: one or more characters; one or more words; one or more lines; one or more paragraphs; one or more document sections; one or more separately-stored document fragments; one or more arbitrary document spans; one or more drawing elements; or one or more document elements of another type. In some embodiments, the facility automatically shifts between different granularities based upon factors such as the size of the document, the area in which the document representation is being displayed, the zoom level at which the document representation is being displayed, the scroll position of the document representation's display, etc.

In some embodiments, the facility stores the redaction criteria it establishes in a way that makes them usable by a separate access policy management system in order to regulate access to the corresponding content, and/or itself performs this function. For example, when a particular user opens a document, the facility or the access policy management system determines based upon (1) the user's identity and/or other information about the user, and (2) the redaction criteria established for each document portion to determine how (and whether) each document portion should be displayed to the user. In some embodiments, this results in a proper subset of the document being displayed to the user. In a variety of embodiments, the redaction criteria established by the facility for document portions are used to control a variety of types of access to the document portions, including access to display, access to quote or incorporate into another document, access to revise, access to attach comments, etc.

In some embodiments, the facility tracks and reports a variety of statistics regarding the redaction of portions of documents based upon the number, size, and the nature of criteria, as well as the effect of these conditional redactions on actual redactions during materialization. In a variety of embodiments, the facility reports on the information of this nature with respect to individual documents, groups of documents, individual users, groups of users, etc.

By performing in some or all of the ways described above, the facility provides a helpful and easy-to-use tool for specifying redaction criteria for document portions. In some embodiments, the facility further provides a reduction in the level of computing resources and other resources needed to perform redaction of documents, such as by removing the need to acquire and operate additional hardware resources for storing multiple copies of the same document redacted in different ways for different audiences.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
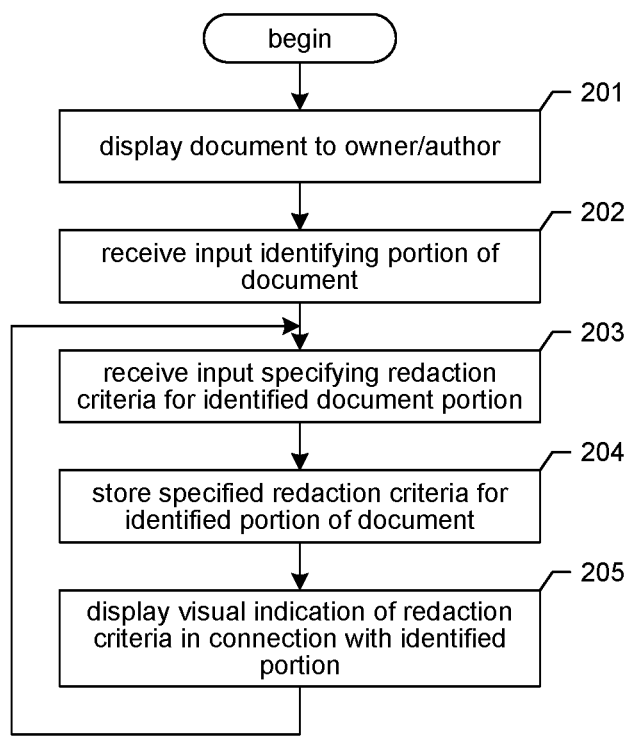
FIG. 2 is a flow diagram showing a process performed by the facility in some embodiments to paint redaction criteria on portions of a document.
Figure 3:
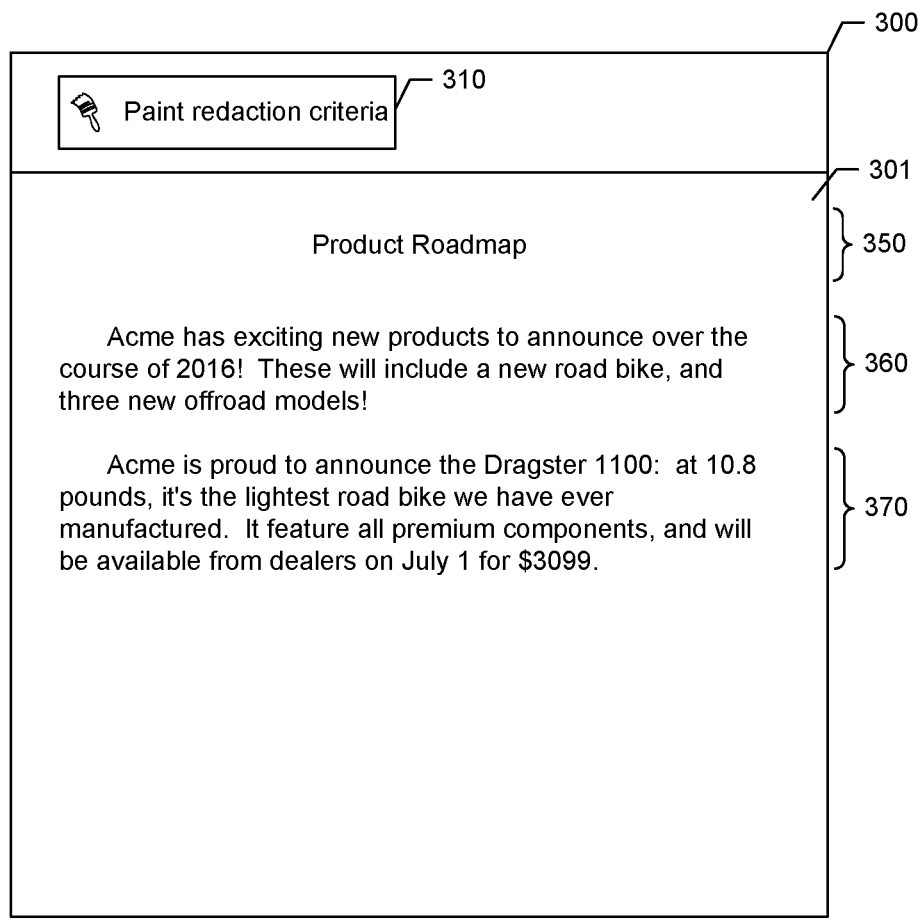
FIG. 3 is a display diagram showing a sample display presented by the facility in some embodiments to present a document for specifying redaction criteria for its portions.
Figure 4:
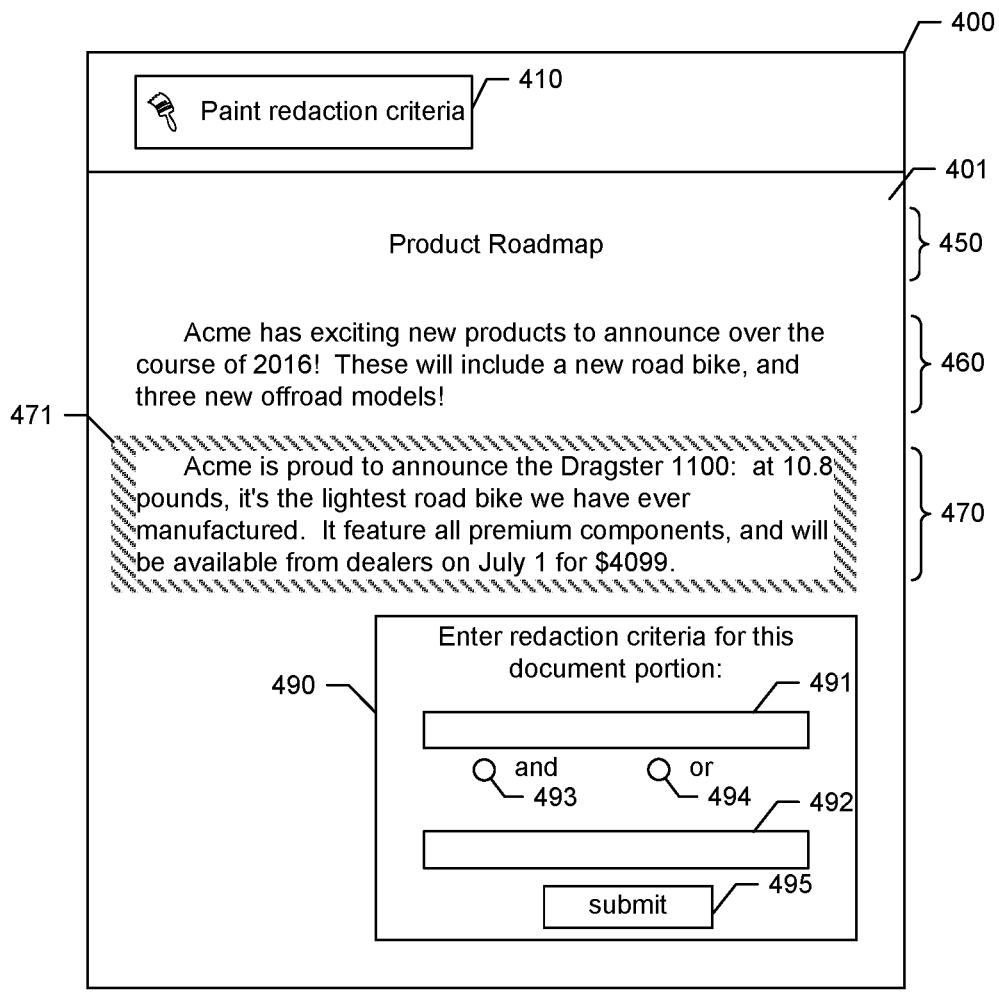
FIG. 4 is a display diagram showing a sample display presented by the facility in some embodiments when the user uses the redaction criteria painting control to paint redaction criteria onto portions of a displayed document.
Figure 5:
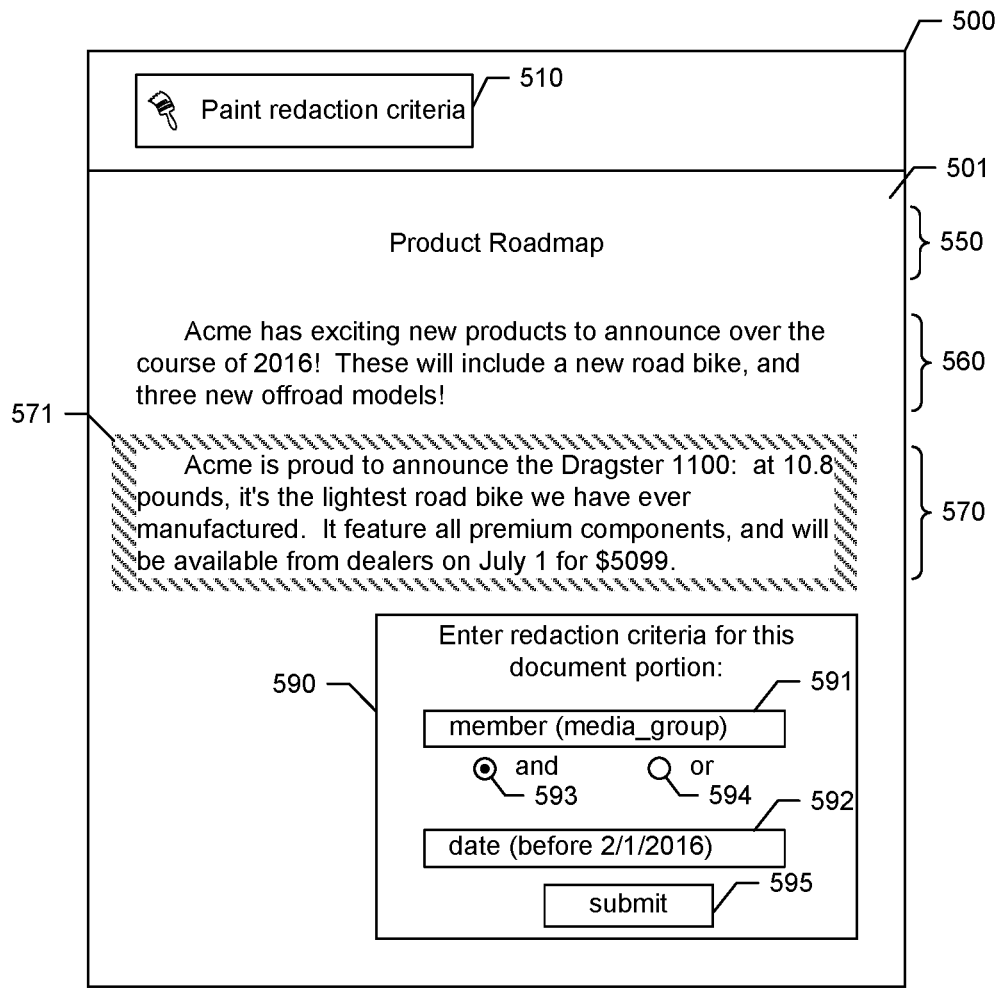
FIG. 5 is a display diagram showing a sample display presented by the facility to enter redaction criteria for a selected document portion.

FIG. 2 is a flow diagram showing a process performed by the facility in some embodiments to paint redaction criteria on portions of a document. In act 201, the facility displays a document to a user authorized to specify redaction criteria for portions of it, such as the document's owner or author. An example of the facility's performance of act 201 is shown in FIG. 3 and discussed below. In act 202, the facility receives user input identifying a portion of the displayed document for which to specify redaction criterion, such as user input representing a painting interaction. An example of the facility's performance of act 202 is shown in FIG. 4 and discussed below. In act 203, the facility receives input specifying redaction criteria for the document portion identified in act 202. An example of the facility's performance of act 203 is shown in FIG. 5 and discussed below. In act 204, the facility stores for the portion of the document identified in act 202 the redaction criteria specified for this portion of the document. An example of the facility's performance of act 204 is shown in FIG. 6 and discussed below. In act 205, the facility augments the display of the document to reflect the establishment of redaction criteria for the identified document portion. For example, in some embodiments, the facility highlights the identified document portion, and displays the redaction criteria established for it when the user hovers the mouse cursor over the identified portion. After act 205, this process concludes.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 3 is a display diagram showing a sample display presented by the facility in some embodiments to present a document for specifying redaction criteria for its portions. The display 300 includes a document window 301 containing a visual representation of the document, including paragraphs 350, 360, and 370. In this case, the document is a marketing memo for a bicycle company. The display further includes a redaction criteria painting control 310. The user can click on, touch, or otherwise interact with this control in order to select a portion of the document for which to specify redaction criteria.

FIG. 4 is a display diagram showing a sample display presented by the facility in some embodiments when the user uses the redaction criteria painting control to paint redaction criteria onto portions of a displayed document. It can be seen in display 400 that the user has painted paragraph 470. The user has done so by interacting with the control 410—such as by touching it—then interacting with paragraph 470—such as by drawing a circle around it. In other embodiments, the user may first interact with paragraph 470, then interact with the control 410. As noted above, the selection of portions can be at virtually any level of granularity, including a character-by-character level. As also noted above, in various embodiments, the facility displays a variety of kinds of visual indications of the redaction criteria established for portions of the document, such as visual indication 471. In response to the selection of paragraph 470, the facility displays a redaction criteria subwindow 490, which contains fields such as fields 491 and 492 for the user to enter one or more redaction criteria, as well as logical operator fields 493 and 494 that the user may select to specify, in cases where more than one redaction criterion is entered, whether any or all of the specified criteria must be satisfied for redaction to occur. The subwindow also includes a submit control 495 that the user can activate in order to complete the specification of criteria for the identified document portion.

FIG. 5 is a display diagram showing a sample display presented by the facility to enter redaction criteria for a selected document portion. The display 500 shows that the user has entered into criterion field 591 the criterion "member (media_group)"; entered into criterion field 592 the criterion "date (before 2/1/2016)"; and selected the "and" logical operator 593. When the user proceeds to activate the submit control 595, the facility establishes the following redaction criteria for paragraph 570 of the document: "member (media_group) AND before (2/1/2016)". One of ordinary skill in the art will appreciate that a variety of other selection mechanisms may be used for fields 591 and 592, including drop-down lists, radio buttons, organizational directories, etc.

This set of redaction criteria means that paragraph 470 will be redacted if the requesting user is a member of the media_group user group and the request is made earlier than Feb. 1, 2016. If the requesting user is not a member of the media_group user group, or if the request is made on Feb. 1, 2016, or later, paragraph 470 will be included in the document's materialization.

In some embodiments, as above, redaction criteria established for a document portion are a basis for redacting the corresponding document portion if they are true. In some embodiments, as above, redaction criteria established for a document portion are a basis for redacting the corresponding document portion if they are false. In some embodiments, the user establishing a set of redaction criteria can explicitly indicate whether the set of redaction criteria are a basis for redacting the corresponding document portion if they are true, or if they are false.

FIG. 6 is a table diagram showing sample contents of a redaction criteria table used by the facility in some embodiments to store redaction criteria that have been established for document portions. The redaction criteria table 600 is made up of rows, such as row 501, each corresponding to a different document portion for which redaction criteria have been established. Each of the rows is divided into the following columns: a document ID column 511 containing an identifier identifying the document in which the portion resides; a portion column 512 identifying a portion of the document to which the redaction criteria apply; and a redaction criteria column 513 identifying the redaction criteria established for the document portion to which the row corresponds. It can be seen that row 601 stores the result of establishing the redaction criteria for paragraph 570 of the sample document based upon the user interactions described above in connection with FIGS. 4 and 5. In various embodiments, the facility uses a variety of schemes to formulate the portion references in column 612, including using paragraph numbers as shown; using character number or other positional ranges; using lists of pointers or identifiers for included document elements, etc. In some embodiments, where the document is stored as a collection of individually-addressable fragments, the facility: (1) ensures that the portion is stored as one or more fragments, splitting existing fragments as needed such that the portion is contained in one or more fragments that do not contain content of the document that is outside the portion; and (2) stores in the redaction criteria table one or more fragment identifiers adequate to identify and retrieve these fragments without the need for any separate document identifier.

While FIG. 6 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

After the facility has been used to paint redaction criteria onto portions of a document, those redaction criteria can be used to control access to those portions of the content by different users, such as by controlling whether different users can view these portions of the document. As noted above, in various embodiments, the facility has various levels of involvement in this control process.

Figure 7:
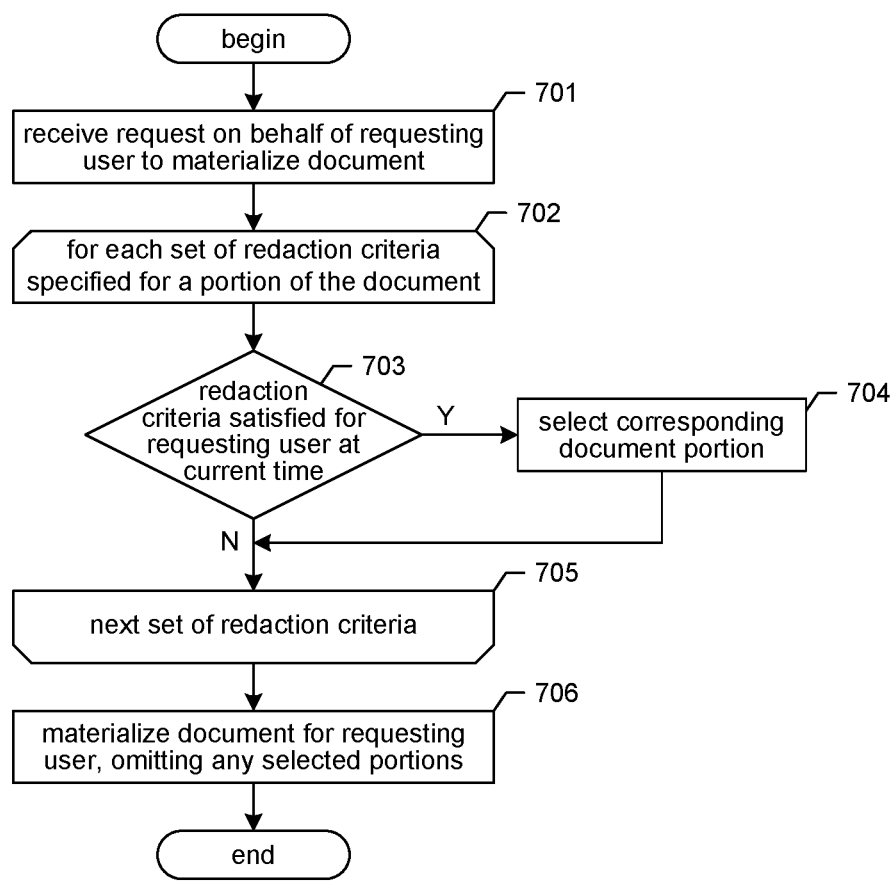
FIG. 7 is a flow diagram showing a process performed by the facility in some embodiments to materialize a document in a manner consistent with redaction criteria established for its portions.

FIG. 7 is a flow diagram showing a process performed by the facility in some embodiments to materialize a document in a manner consistent with redaction criteria established for its portions. In act 701, the facility receives a request on behalf of a particular user to materialize a document. In various embodiments, the requested document materialization may be to display the document to the user, and/or to perform various kinds of analysis or other processing on the document. The request can be originated directly by the user, or on the user's behalf by a computer system, such as a computer system generating a machine learning model or a search index, or one evaluating a search query. In acts 702-705, the facility loops through each set of redaction criteria established for portions of the document. In act 703, if the redaction criteria are satisfied for the requesting user at the current time, then the facility continues in act 704, else the facility continues in act 705. In act 704, the facility selects the portion of the document corresponding to the redaction criteria determined to be satisfied in act 703. In act 705, if additional sets of redaction criteria remain to be processed, then the facility continues in act 702 to process the next set of redaction criteria, else the facility continues in act 706. In act 706, the facility materializes the document for the requesting user in a way that omits any of the portions of the document selected in act 704. In some embodiments, the facility performs act 706 on a computer system other than the user's computer system—such as on a server—in a manner that prevents contents of any of the redacted portions from ever being present on the user's computer system. After act 706, this process concludes.

Figure 8:
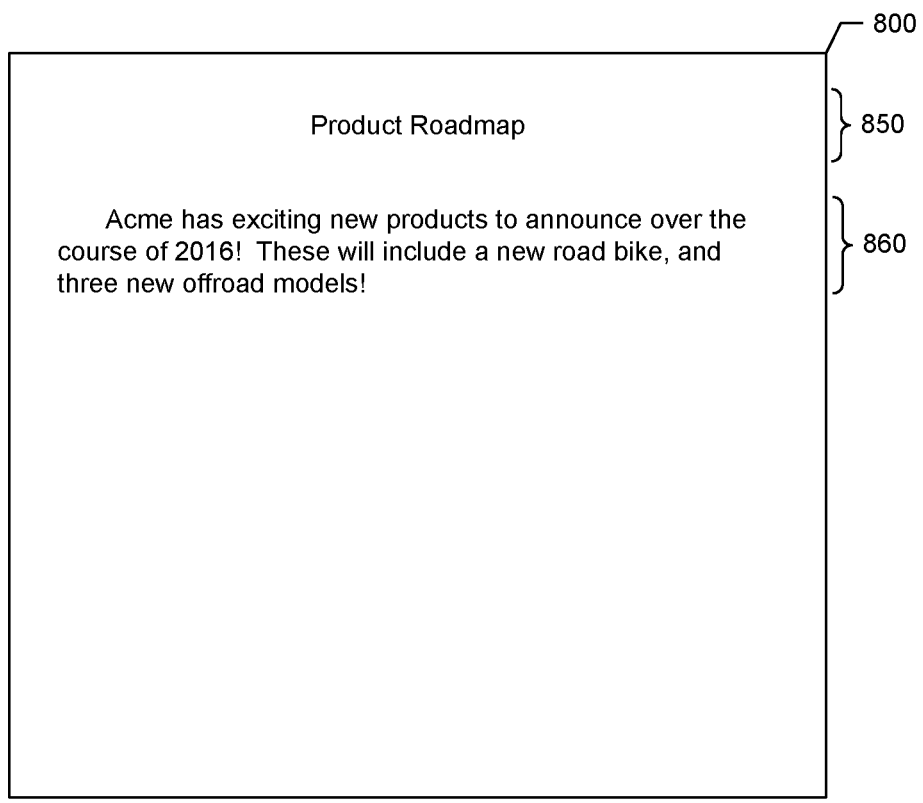
FIG. 8 is a display diagram showing a sample display presented by the facility in some embodiments to display a materialized document portions of which are redacted.

FIG. 8 is a display diagram showing a sample display presented by the facility in some embodiments to display a materialized document portions of which are redacted. The first user is a member of the user group "media_group", and the request is made on Jan. 10, 2016. Accordingly, the document representation 801 presented to the first user is one that includes paragraphs 850 and 860, none of which is the subject of redaction criteria. Omitted is paragraph 370 shown in FIG. 3, which is subject to the redaction criteria "member (media_group) AND before (2/1/2016)", because the first user is a member of the "media_group" user group and the request date is before Feb. 1, 2016.

In various embodiments, the facility takes various approaches to showing or not showing the omission of redacted document portions. If there were additional paragraphs in the sample document, in some embodiments they would be positioned in the same location relative to displayed paragraph 860, implicitly conveying the omission of content between paragraphs 860 and the additional paragraphs. In some embodiments (not shown), the facility explicitly indicates this omission, such as by displaying a gray box in this space, displaying two gray boxes each corresponding to the dimensions of omitted paragraphs, etc.

In other embodiments (not shown), the facility moves any additional paragraphs to be immediately below displayed paragraph 860, providing no explicit or implicit indication the content has been omitted between paragraph 860 and any additional paragraphs.

Figure 9:
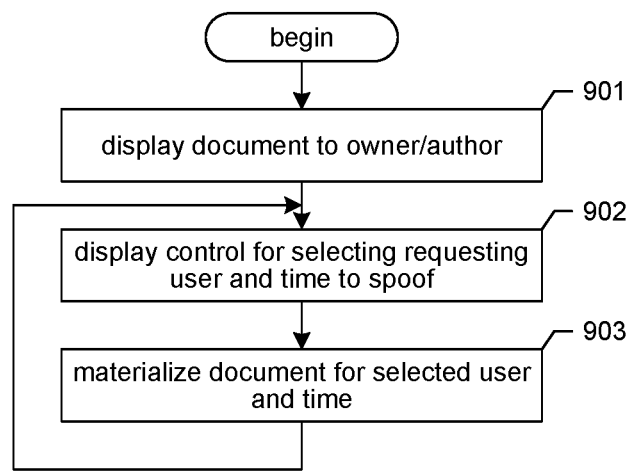
FIG. 9 is a flow diagram showing a process performed by the facility in some embodiments to visualize the materialization of a document that would occur for a particular user at a particular time.

FIG. 9 is a flow diagram showing a process performed by the facility in some embodiments to visualize the materialization of a document that would occur for a particular user or category of user at a particular time. In some embodiments, the facility performs this process only for a user authorized to establish redaction criteria for the document, such as its owner or author. In act 901, the facility displays the document. In act 902, the facility displays a control that the user can operate to select a requesting user or category of user and a particular time to spoof in materializing the document. In act 903, the facility materializes the document from the selected user and time. After act 903, the facility continues in act 902 to receive a new user and/or time to spoof. Examples of the facility's performance of this process are shown in FIGS. 10-12 and discussed below.

Figure 10:
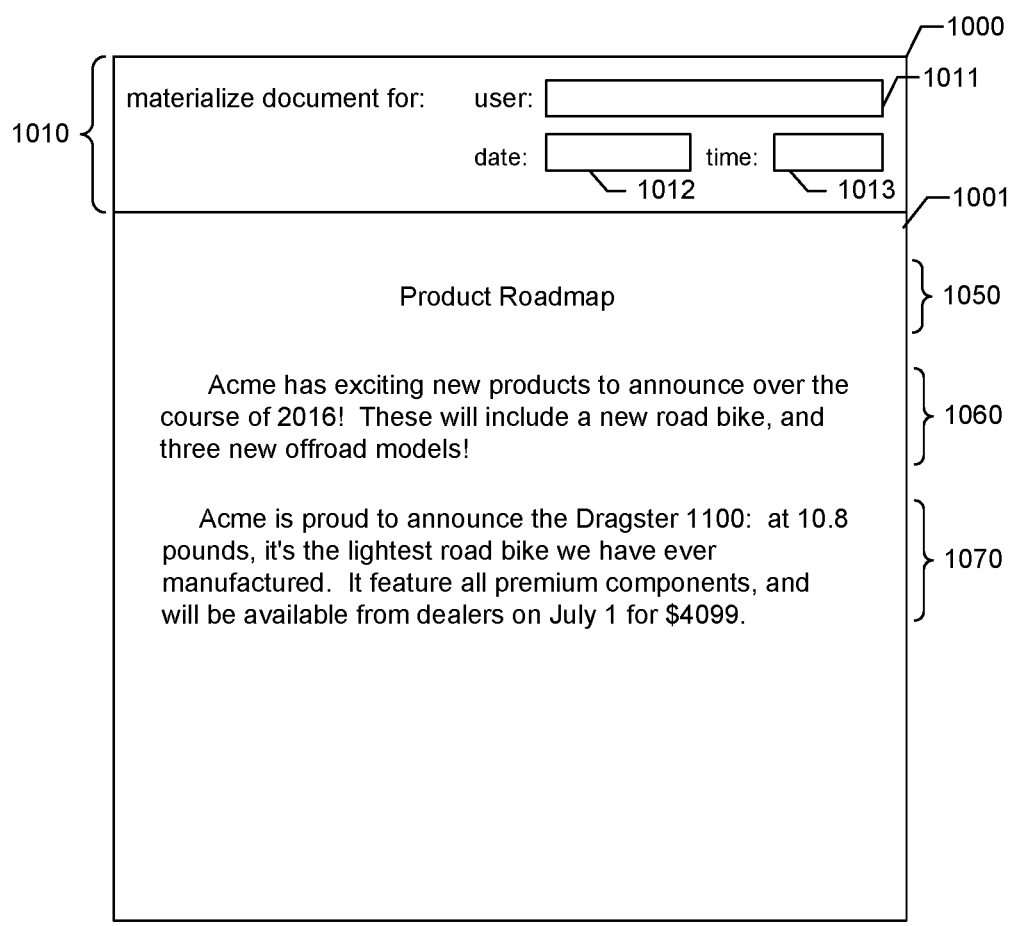
FIG. 10 is a display diagram showing a first sample display presented by the facility to spoof a particular user or category of user at a particular time to see how a sample document would be redacted for that user or category of user at that time.

FIG. 10 is a display diagram showing a first sample display presented by the facility to spoof a particular user or category of user at a particular time to see how a sample document would be redacted for that user or category of user at that time. The display 1000 includes a window 1001 showing the entire sample document—paragraphs 1050, 1060, and 1070. The display further includes a spoofing control 1010 that the user can use to specify a user and time to spoof. In particular, the control includes a user field 1011 into which the user can enter information identifying a user to spoof, and date and time fields 1012 and 1013 into which the user can enter a date and time to spoof.

Figure 11:
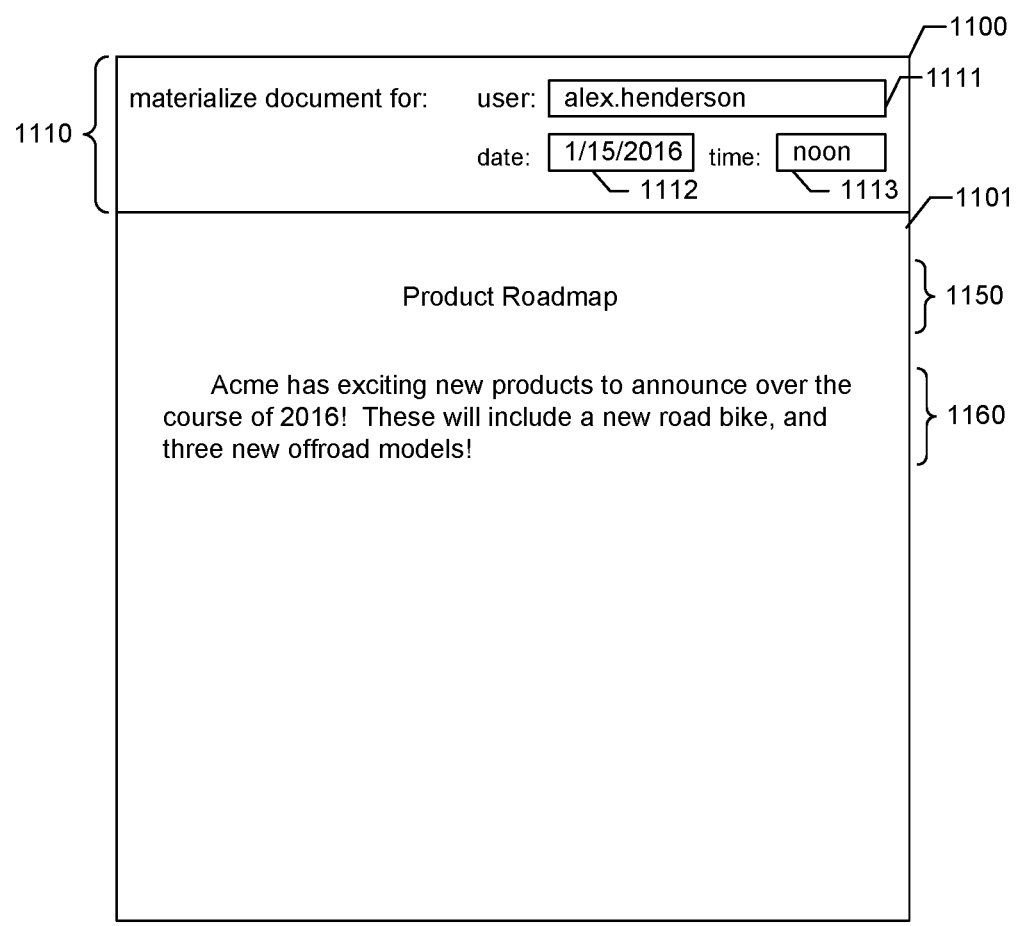
FIG. 11 is a display diagram showing a second sample display presented by the facility to spoof a particular user or category of user at a particular time to see how a sample document would be redacted for that user or category of user at that time.

FIG. 11 is a display diagram showing a second sample display presented by the facility to spoof a particular user or category of user at a particular time to see how a sample document would be redacted for that user or category of user at that time. In display 1100, it can be seen that the user has entered the user identifier "alex.henderson" into user field 1111 and the time of noon on Jan. 15, 2016 into the date and time fields 1112 and 1113. In response, the facility has rematerialized the document in a way that omits paragraph 1070 shown in FIG. 10, since this paragraph is the subject of redaction criteria that causes this paragraph to be redacted where the requesting user is in the user group "media_group" and the date of the request is before Feb. 1, 2016; in this case the user alex.henderson is in the media_group, and the spoofed date is before Feb. 1, 2016. In another example, the user may enter a user category or another characteristic that that is associated with a user category. For example, rather than specifying a particular user (e.g., alex.henderson) in the media group, the user may enter the group identifier "media_group" along with the date and time of request to see how the document would be redacted for users in the media group.

Figure 12:
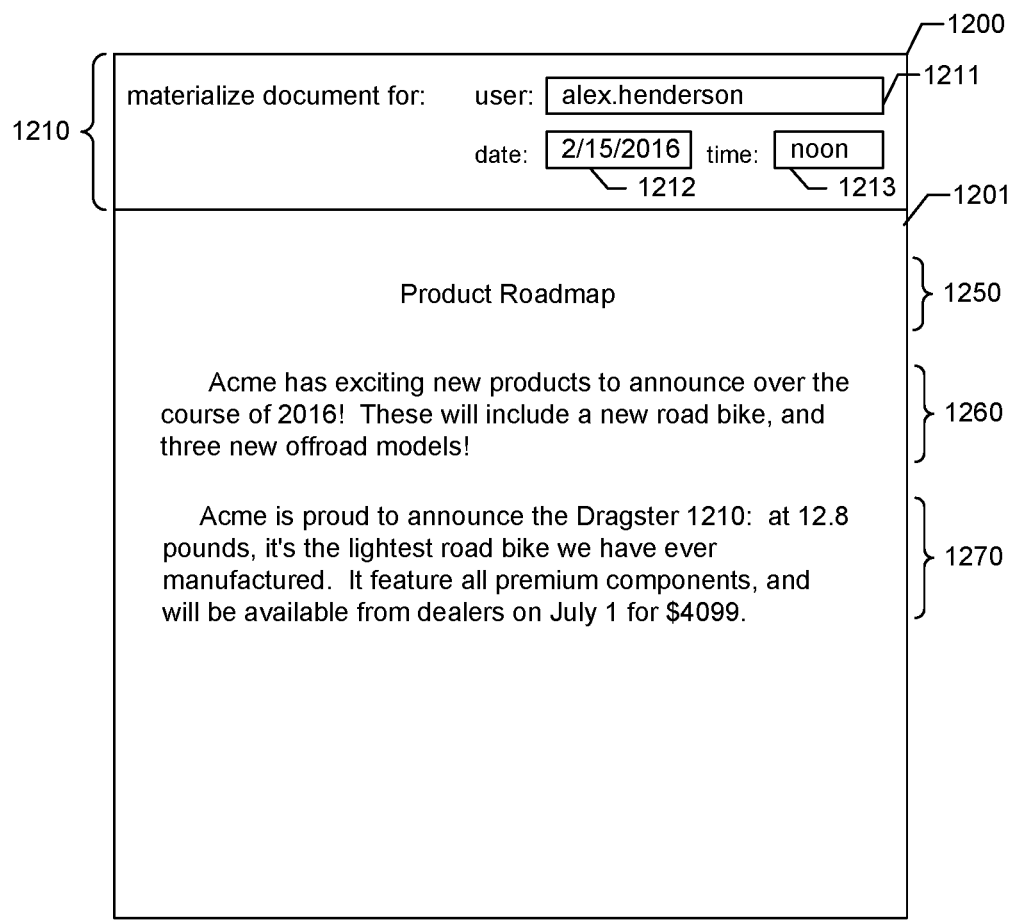
FIG. 12 is a display diagram showing a third sample display presented by the facility to spoof a particular user or category of user at a particular time to see how a sample document would be redacted for that user or category of user at that time.

FIG. 12 is a display diagram showing a third sample display presented by the facility to spoof a particular user or category of user at a particular time to see how a sample document would be redacted for that user or category of user at that time. It can be seen in display 1200 that the user has changed the spoofed date from Jan. 15, 2016 to Feb. 15, 2016. Because this date no longer satisfies the redaction criterion "before (2/1/2016)", the facility has rematerialized the document in a way that no longer redacts paragraph 1270.

In some embodiments, the facility provides a computer-readable medium having contents adapted to cause a computing system to: receive one or more requests each to materialize an identified document, each request identifying an entity for which the identified document is to be materialized; for each received request: for a portion of the document identified by the request, retrieve a criterion that must be satisfied to include the portion in a materialization of the document identified by the request; evaluate the criterion for the entity identified by the request with respect to a present time; and cause the document identified by the request to be materialized for the entity identified by the request in a manner consistent with the result of the evaluation.

In some embodiments, the facility provides a method in a computing system comprising: receiving one or more requests each to materialize an identified document, each request identifying an entity for which the identified document is to be materialized; for each received request: for a portion of the document identified by the request, retrieving a criterion that must be satisfied to include the portion in a materialization of the document identified by the request; evaluating the criterion for the entity identified by the request with respect to a present time; and causing the document identified by the request to be materialized for the entity identified by the request in a manner consistent with the result of the evaluation.

In some embodiments, the facility provides a method in a computing system, comprising: receiving a request to materialize a document, the request identifying an entity for which the document is to be materialized and a time for which the document is to be materialized; for a portion of the document, retrieving a criterion that must be satisfied to include the portion in a materialization of the document; evaluating the criterion for the identified entity with respect to the identified time; and causing the document to be materialized in a manner consistent with the result of the evaluation.

In some embodiments, the facility provides a computer-readable medium having contents adapted to cause a computing system to: receive a request to materialize a document, the request identifying an entity for which the document is to be materialized and a time for which the document is to be materialized; for a portion of the document, retrieve a criterion that must be satisfied to include the portion in a materialization of the document; evaluate the criterion for the identified entity with respect to the identified time; and cause the document to be materialized in a manner consistent with the result of the evaluation.

In some embodiments, the facility provides a computing system, comprising: a processor; and a memory have contents that, when executed by the processor: receive a request to access a distinguished document on behalf of a particular user; for a portion of the distinguished document, retrieve a criterion that must be satisfied for the user to have authority to access the portion; evaluate the criterion for the user at a present time; and in response to determining by the evaluation that the criterion is not satisfied for the user at a present time, provide access to an incomplete manifestation of the distinguished document from which the portion is omitted.

In some embodiments, the facility provides a computer-readable medium having contents adapted to cause a computing system to: receive a request to access a distinguished document on behalf of a particular user; for a portion of the distinguished document, retrieve a criterion that must be satisfied for the user to have authority to access the portion; evaluate the criterion for the user at a present time; and in response to determining by the evaluation that the criterion is not satisfied for the user at a present time, provide access to an incomplete manifestation of the distinguished document from which the portion is omitted.

In some embodiments, the facility provides a method in a computing system, comprising: receiving a request to access a distinguished document on behalf of a particular user; for a portion of the distinguished document, retrieving a criterion that must be satisfied for the user to have authority to access the portion; evaluating the criterion for the user at a present time; and, in response to determining by the evaluation that the criterion is not satisfied for the user at a present time, providing access to an incomplete manifestation of the distinguished document from which the portion is omitted.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer memory storing programs and data wherein the programs when executed cause a computing system to:
   receive one or more requests each to materialize an identified document, each request identifying an entity for which the identified document is to be materialized;
   for each received request:
      for a portion of the document identified by the request, retrieve a criterion that, if satisfied, is a basis for excluding the portion from a materialization of the document identified by the request;
      evaluate the criterion for the entity identified by the request with respect to a present time; and
      cause the document identified by the request to be materialized for the entity identified by the request in a manner consistent with the result of the evaluation,
   wherein the request is a request to identify, among a plurality of documents including the identified document, any documents that match a specified query, and wherein the computing system is configured to determine that the identified document does not satisfy the specified query; and in response to the determining, identifying as matching the specified query documents that contain neither the identified document nor any copy or rendering of the identified document.

2. The computer memory of claim 1 wherein the entity identified by a distinguished received request is a person.

3. The computer memory of claim 2 wherein, for a portion of a document identified by the distinguished received request, the criterion is that the person identified by the distinguished received request is attributed a role among a set of one or more particular roles.

4. The computer memory of claim 2 wherein, for a portion of a document identified by the distinguished received request, the criterion is that the person identified by the distinguished received request is a member of a group among a set of one or more particular groups.

5. The computer memory of claim 2 wherein, for a portion of a document identified by the distinguished received request, the criterion is that the person identified by the distinguished received request has not greater than a threshold privilege level.

6. The computer memory of claim 1 wherein the entity identified by a distinguished received request is an organization.

7. The computer memory of claim 1 wherein the entity identified by a distinguished received request is a computer system.

8. The computer memory of claim 1 wherein, for a distinguished request, the evaluating determines that the criterion is satisfied for the entity identified by the request with respect to the present time, and
   wherein causing the document identified by the request to be materialized comprises:
      transmitting to a computer system operated by the entity identified by the request only contents of the document identified by the request that exclude the portion of the document.

9. The computer memory of claim 1 wherein a first request is received at a first time and a second request is received at a second time distinct from the first time,
   wherein both the first and second request identify the same document and the same entity,
   wherein, for the first request, the evaluating determines that the criterion is not satisfied for the entity identified by the request with respect to the present time,
   wherein, for the first request, the document identified by the request is materialized in a manner that includes the portion,
   wherein, for the second request, the evaluating determines that the criterion is satisfied for the entity identified by the request with respect to the present time, and
   wherein, for the second request, the document identified by the request is materialized in a manner that excludes the portion.

10. The computer memory of claim 9 wherein, at the second time, the entity has a qualification that it does not have at the first time.

11. The computer memory of claim 9 wherein the second time is within a period defined for the criterion, while the first time is not within a period defined for the criterion.

12. A method in a computing system, comprising:
   receiving a request to materialize a document, the request identifying an entity for which the document is to be materialized and a time for which the document is to be materialized;
   for a portion of the document, retrieving a criterion that must be satisfied to include the portion in a materialization of the document;
   evaluating the criterion for the identified entity with respect to the identified time;
   determining whether the request was originated by a person authorized to specify redaction criteria for portions of the document; and
   causing the document to be materialized in a manner consistent with the result of the evaluation when the request was originated by a person authorized to specify redaction criteria for portions of the document.

13. The method of claim 12 wherein the document is materialized for display in connection with a visual indication of the entity and time identified by the request.

14. The method of claim 13 wherein visual indication comprises a control that can be manipulated to specify different times for which the document is to be materialized.

15. A computing system, comprising:
   a processor; and
   a memory having contents that, when executed by the processor:
      receive a request to access a distinguished document on behalf of a particular user and to access a machine learning model trained using as observations a plurality of documents including the distinguished document, wherein the machine learning model is configured to process the distinguished document;

for a portion of the distinguished document, retrieve a criterion that must be satisfied for the user to have authority to access the portion;

evaluate the criterion for the user at a present time; and in response to determining by the evaluation that the criterion is not satisfied for the user at the present time, provide access to an incomplete manifestation of the distinguished document from which the portion is omitted and decline to provide access to the machine learning model.

16. The computing system of claim 15 wherein the request is a request to display the distinguished document to the user, the memory having contents that further, when executed by the processor:

cause the incomplete manifestation of the distinguished document from which the portion is omitted to be displayed to the user.

17. The computing system of claim 15, the memory having contents that further, when executed by the processor:

select a proper subset of the plurality of documents that excludes the distinguish document;

train a proxy machine learning model using as observations only selected documents of the plurality; and in response to the request, providing access to the proxy model.

\* \* \* \* \*